J. B. RICKETTS.
Eye-Shade.
No. 207,624.  Patented Sept. 3, 1878.
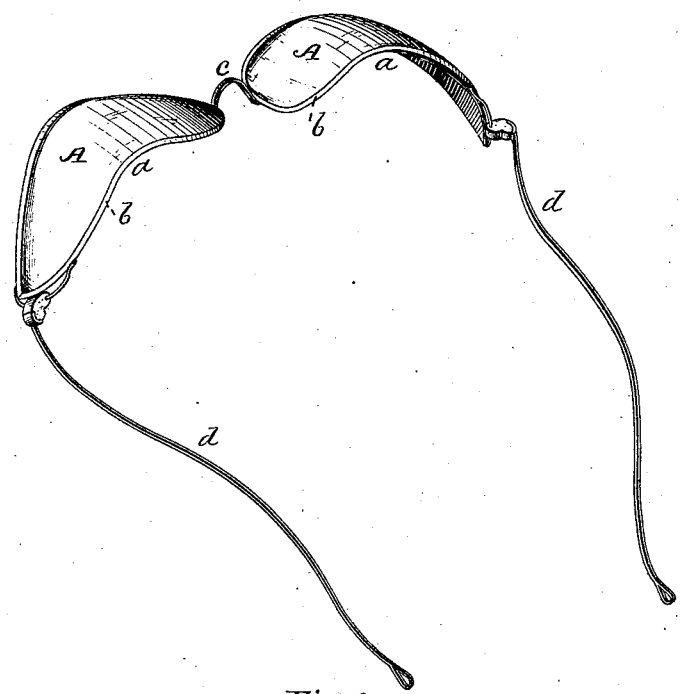
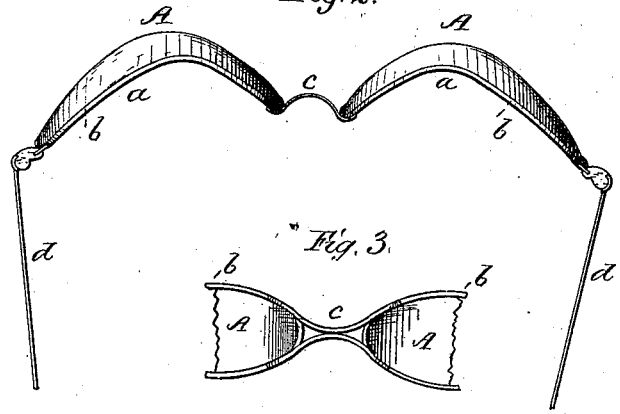
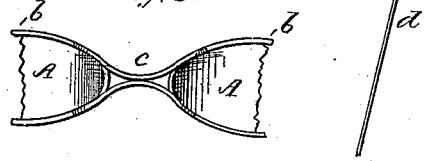
Attest.
F. B. Groff
A. Scott
Inventor.
John B. Ricketts
per Chas. H. Fowler
Attorney.

UNITED STATES PATENT OFFICE.

JOHN B. RICKETTS, OF ST. JOSEPH, MISSOURI.

IMPROVEMENT IN EYE-SHADES.

Specification forming part of Letters Patent No. 207,624, dated September 3, 1878; application filed August 1, 1878.

*To all whom it may concern:*

Be it known that I, JOHN B. RICKETTS, of St. Joseph, in the county of Buchanan and State of Missouri, have invented a new and valuable Improvement in Eye-Shades; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my invention. Fig. 2 is a plan view of the same. Fig. 3 is a view showing a modification of the nose-piece or bridge.

This invention has relation to shades or awnings for protecting the eyes from the rays of light, the shades being connected together by a suitable nose-piece or bridge, and having the usual temple-bows or other means for holding them in position, as ordinarily used on spectacles.

In the accompanying drawings, A represents the shades, of colored glass, wood, or any other material desired that will temper the light or prevent it from falling directly upon the eye. The shades A are concavo-convex in form, and flare outward at their lower edge, and at their upper edge have a depression or slightly-concave edge, $a$, to fit under the eyebrow. These shades A may be, if desired, fitted within a frame or frames, $b$, the frames connected together by a suitable nose-piece or bridge, $c$, and provided with side or temple bows $d$, or by any other suitable attachment used for the purpose of holding the shades in position; and, if desired, the nose-piece or bridge may be made of two pieces of wire joined at their center, and the ends connected to the shades, as illustrated in Fig. 3 of the drawings.

The side bows, frames, and nose-piece may be variously modified, and if found expedient the frames may be dispensed with, and the nose-piece and side bows connected directly to the shades.

The peculiar form of the shades A, after being adjusted and fitted under the eyebrows, gives the eyes a sufficient range of vision, as the wearer does not look through the glass, as the shades are above the eye, and their convexity not sufficient to obstruct the vision.

As I have previously stated, the shades could be made of various materials, such as wood, rubber, ground or roughened glass, paper —in fact, any material that will serve the purpose of a shade to soften the rays of light, or prevent them from coming directly upon the eye.

The shades will be of various sizes, and they will vary in shape somewhat, although the principle will remain the same—as, for instance, some eyes are much flatter than others, and will require less curve in the shade. The shades will also vary in width in accordance with their use—as, for instance, sore eyes will require larger shades than those used as ordinary sun-shades, and will come down far enough to cover the eye, but will flare out at the bottom sufficiently to allow the desired range of vision. It may also be found necessary in some cases to line the upper part of the shade with rubber, velvet, or any other soft material to render the shades comfortable to the wearer.

One of the very important features of my invention is, that the shade fits under the eyebrow, and if the shade conforms in any degree to the shape of the eye the bone projecting over the eye comes to the relief and assists to form a complete shade.

Having now fully described my invention, what I claim as new, and desire to secure by Letters Patent, is—

A shade or awning for the eyes, consisting of two concavo-convex surfaces of suitable material, connected by a nose-piece or bridge, and forming an awning for the eyes, substantially as and for the purpose set forth.

In testimony that I claim the above I have hereunto subscribed my name in the presence of two witnesses.

JOHN B. RICKETTS.

Witnesses:
WILLIAM DUESLER, Jr.,
CHAS. HULL.